(12) United States Patent
Herz

(10) Patent No.: US 8,942,536 B2
(45) Date of Patent: Jan. 27, 2015

(54) VIDEO NAVIGATION SYSTEM AND METHOD

(75) Inventor: William S. Herz, Hayward, CA (US)

(73) Assignee: Nvidia Corporation, Santa Clara, CA (US)

( * ) Notice: Subject to any disclaimer, the term of this patent is extended or adjusted under 35 U.S.C. 154(b) by 1330 days.

(21) Appl. No.: 11/903,012

(22) Filed: Sep. 19, 2007

(65) Prior Publication Data

US 2009/0074377 A1    Mar. 19, 2009

(51) Int. Cl.
*H04N 5/932* (2006.01)
*H04N 9/804* (2006.01)
*H04N 5/85* (2006.01)
*H04N 5/765* (2006.01)

(52) U.S. Cl.
CPC .............. *H04N 9/8042* (2013.01); *H04N 5/85* (2013.01); *H04N 5/765* (2013.01)
USPC .......................................... 386/219; 386/230

(58) Field of Classification Search
None
See application file for complete search history.

(56) References Cited

U.S. PATENT DOCUMENTS

| | | | |
|---|---|---|---|
| 4,528,563 A | 7/1985 | Takeuchi | |
| 5,471,389 A | 11/1995 | Hahlganss | |
| 6,029,110 A | 2/2000 | Zuber et al. | |
| 6,087,961 A | 7/2000 | Markow | |
| 6,097,285 A | 8/2000 | Curtin | |
| 6,175,896 B1* | 1/2001 | Bui | 711/118 |
| 6,181,996 B1 | 1/2001 | Chou et al. | |
| 6,587,770 B1 | 7/2003 | Gray et al. | |
| 6,684,176 B2 | 1/2004 | Willins et al. | |
| 6,731,204 B2 | 5/2004 | Lehmann | |
| 6,778,073 B2 | 8/2004 | Lutter et al. | |
| 6,876,298 B2 | 4/2005 | Litkouhi et al. | |
| 7,188,005 B2 | 3/2007 | Toba et al. | |
| 7,376,388 B2 | 5/2008 | Ortiz et al. | |
| 7,581,182 B1 | 8/2009 | Herz | |
| 7,649,444 B1 | 1/2010 | Fear et al. | |
| 7,685,619 B1 | 3/2010 | Herz | |
| 7,782,363 B2 | 8/2010 | Ortiz | |
| 7,813,621 B2* | 10/2010 | Agrahara | 386/248 |
| 8,184,169 B2 | 5/2012 | Ortiz | |
| RE43,598 E | 8/2012 | Alexander et al. | |
| RE43,601 E | 8/2012 | Arseneau et al. | |
| 8,250,617 B2 | 8/2012 | Hensgen et al. | |
| 8,457,838 B1 | 6/2013 | Fear et al. | |
| 8,683,067 B2 | 3/2014 | Herz | |
| 2002/0010655 A1 | 1/2002 | Kjallstrom | |
| 2003/0041110 A1* | 2/2003 | Wenocur et al. | 709/206 |
| 2003/0208771 A1 | 11/2003 | Hensgen et al. | |
| 2004/0107449 A1* | 6/2004 | Fukuda et al. | 725/135 |

(Continued)

FOREIGN PATENT DOCUMENTS

WO    2005016701    2/2005

*Primary Examiner* — William C Vaughn, Jr.
*Assistant Examiner* — Eileen Adams

(57) ABSTRACT

A video navigation system and method can be utilized to efficiently and adjustably navigate video content. In one embodiment, a video information control method facilitates efficient video navigation. A video stream is received and video access point selection between multiple access points in said video stream is controlled. The presentation information is forwarded for each of the multiple access points. In one exemplary implementation, the presentation information is forwarded to a display and the information is directed to presenting a main viewing area and navigation areas that present looping video clips or portions of the video stream at time intervals ahead of and behind the video portion being presented in the main viewing area.

17 Claims, 11 Drawing Sheets

(56) References Cited

U.S. PATENT DOCUMENTS

| | | |
|---|---|---|
| 2004/0119815 A1 | 6/2004 | Soloff |
| 2004/0208494 A1* | 10/2004 | Green .......................... 386/125 |
| 2005/0240980 A1 | 10/2005 | Jun et al. |
| 2006/0007963 A1* | 1/2006 | Kang et al. .................... 370/535 |
| 2006/0212833 A1* | 9/2006 | Gallagher et al. ............. 715/848 |
| 2006/0227871 A1* | 10/2006 | Budagavi ................. 375/240.12 |
| 2007/0032912 A1 | 2/2007 | Jung et al. |
| 2007/0033494 A1* | 2/2007 | Wenger et al. ................ 714/776 |
| 2007/0101394 A1 | 5/2007 | Fu et al. |
| 2007/0217518 A1* | 9/2007 | Valmiki et al. ........... 375/240.24 |
| 2007/0280298 A1 | 12/2007 | Hearn et al. |
| 2007/0283390 A1* | 12/2007 | Gordon et al. .................. 725/43 |
| 2008/0005348 A1 | 1/2008 | Kosiba et al. |
| 2009/0009605 A1 | 1/2009 | Ortiz |
| 2009/0074377 A1 | 3/2009 | Herz |
| 2009/0309975 A1 | 12/2009 | Gordon et al. |
| 2010/0289900 A1 | 11/2010 | Ortiz |
| 2011/0231428 A1 | 9/2011 | Kuramura |

* cited by examiner

| 720 | 721 | 722 | 723 |
| --- | --- | --- | --- |
| 724 | 725 | 726 | 727 |
| 728 | 729 | 730 | 731 |

FIGURE 4C

VIDEO NAVIGATION SYSTEM AND METHOD

FIELD OF THE INVENTION

The present invention relates to video navigation systems and methods.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Frequently, these advantageous results are realized through the use of video presentations. The video presentations typically provide information in a format that humans find easy to observe and digest significant amounts of data in relatively short periods of time. However, video presentations can be very long and navigation of the video content difficult.

Traditional attempts at video navigation are usually limited. Conventional approaches that simply rely on moving through the content sequentially in a fast forward/reverse scan mode still subjects the user to viewing substantially the entire content. Some conventional approaches permit a user to jump ahead or back a prescribed amount of time but the jumps are typically "blind" in the sense the user does not have an idea where the jump is to until the jump is made and content is presented. In addition, it often takes a user several "blind" jumps to get to a desired portion of the presentation.

SUMMARY

Description of a video navigation system and method are presented in accordance with embodiments of the present invention. The present invention video navigation systems and methods can be utilized to efficiently and flexibly navigate video content. In one embodiment, a video information control method facilitates efficient video navigation. A video stream is received and video access point selection between multiple access points in the video stream is controlled. The presentation information is rendered for each of the multiple access points. In one exemplary implementation, the presentation information is forwarded to a display and the information is directed to presenting a main viewing area for presenting content a user is primarily interested in and navigation areas that present video clips or portions of the video stream at time intervals ahead of and/or behind the video portion being presented in the main viewing area. In one exemplary implementation, a user can trigger "movement" of content from a navigation viewing area to the main viewing area.

DESCRIPTION OF THE DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 4C is an exemplary raster pattern video navigation presentation in accordance with one embodiment of the present invention.

DETAILED DESCRIPTION

Figure 1A:
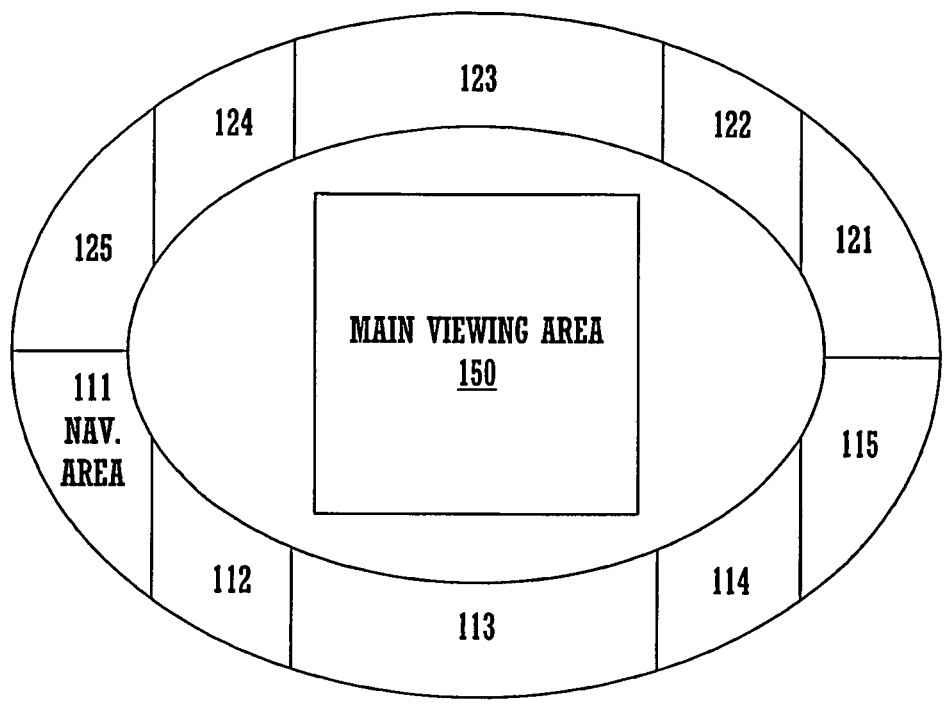
FIG. 1A is a block diagram of an exemplary rotational carousel video navigation presentation in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Present invention systems and methods facilitate efficient and effective video navigation. In one embodiment, facilitating video navigation includes forwarding information associated with presentation of a first portion of a program in a main viewing area with information associated with simultaneous presentation of other portions of the same program in navigation viewing areas. The main viewing area can be associated with a presentation a user is primarily interested in. The video navigation areas can display clips presenting content of a video that is different in points of time (e.g., forward, backward, etc.) than the content presentation in the main viewing area. In one exemplary implementation, the main viewing area and navigation viewing areas are presented on a display monitor and a user can navigate the content (e.g., move forward in the content, move backward in the content, etc.) by triggering replacement of or change in the content presented in a viewing area (e.g., replacing content in the main viewing area with content from a selected navigation viewing area, causing a movement, rotation or different arrangement in a navigation presentation, etc.). A user can peer through the windows or navigation areas of the video and see the content, relative to time lined access points. In this fashion, a user can narrow in on the content of interest much faster and more intelligently than through conventional attempts at "blind" video navigation.

In one embodiment, a processor (e.g., graphics processor, a central processor, or extensions thereof, etc.) is utilized to access an audio visual (AV) stream at specific time intervals and display the sequences in a UI (User Interface). The accessed audio video stream is decoded (e.g., decompressed, decrypted, other activities associated with making content available, etc.). In one embodiment, a processor coordinates the presentation of the content segments in the navigation viewing areas and utilizes a number of graphics features to enable a variety of presentation effects including introduction of perspective, image dissolution or fading, scaling, etc. In one exemplary implementation, processor graphics capabilities (e.g., vector processing, three dimensional rendering, scaling, zoom, texture, shading, master decoding, simultaneous decode, etc.) are utilized to enable presentation of the navigation viewing areas and associated content segments in a variety of configurations (e.g., carousel, helix, globe, etc.). The presentations can be configured to convey intuitive timing relationships of the content segments associated with navigation viewing areas (e.g., fast forward expediting to "later" content, reverse to "earlier" content, etc.). A processor can control the navigation presentation for abrupt changes in navigation content between the viewing areas (e.g., from one frame to another non-sequential frame,) or the processor can introduce animation to present a transition smoothly (e.g., from one viewing area to another).

It is appreciated that dynamic flexibility is supported in presentation of the navigation viewing areas and associated content segments. For example, navigation content can be presented in variety of different lengths and temporal relationships (e.g., every 15 seconds, 30 seconds, 1 minute, 15 minutes, etc.) and at different viewing speeds (e.g., same as real time or normal speed, faster than real time or fast motion speed, slower than real time or slow motion speed, still or pause, etc.). The temporal relationships can include linear (e.g., every clip is 10 seconds, every clip is 20 seconds, etc.) or exponential (e.g., a first clip segment is 10 seconds, a second clip segment is 30 seconds, a fourth clip is 1 hour, etc.). It is also appreciated that the navigation viewing areas can be presented in a variety of configurations (e.g., a rotational carosel, a double helix, etc.) and variety of timing associations (e.g., a first helix going forward in content time, a second helix going backward in content time). In one exemplary implementation, application program interface features (e.g., Microsoft Direct X video acceleration features, other API interfaces, etc.) are utilized in presenting the navigation content segments.

It is appreciated that decoding operations associated with the present invention can be accomplished by a plurality of processing resources working individually or together in a variety of combinations. In one embodiment, a first portion of a video stream is decoded by a central processor and a second portion of the video stream is decoded by a graphics processor. In one exemplary implementation, the central processor decodes a portion of the video stream associated with a first navigation viewing area and the graphics processor decodes a portion of the video stream associated with a second navigation viewing area. Alternatively, the decoding can be performed by multiple central processors or multiple graphics processors. For example, the decoding can be performed by a first central processor and a second central processor, the decoding can be performed by a graphics processor and a central processor, or a portion of the decoding can be performed by a central processor and a portion performed by a graphics processor times two. It is also appreciated that an application specific integrated circuit (ASIC) can perform operations associated with the present invention. In one embodiment, a dedicated ASIC is utilized to decode a video stream (e.g., a Blu-ray decoder chip, other ASIC, etc.).

FIG. 1A is one exemplary implementation of exemplary video navigation presentation 100 in accordance with one embodiment of the present invention. In one embodiment, the video navigation presentation 100 includes navigation viewing areas configured in a rotating carousel. It is appreciated that video navigation presentation 100 can be presented via a variety of display types (e.g., a display, a monitor, a television, a projection screen, etc.). Skip video navigation presentation 100 includes a main viewing area 150, video navigation areas 111, 112, 113, 114, 115, 121, 122, 123, 124, and 125. In one embodiment, main viewing area 150 displays video content a user is primarily interested in. The navigation viewing areas present content that is temporally related (e.g., forward or advancing in normal viewing sequence, backward in normal viewing sequence, etc.) to the content in the main viewing area.

Figure 5:
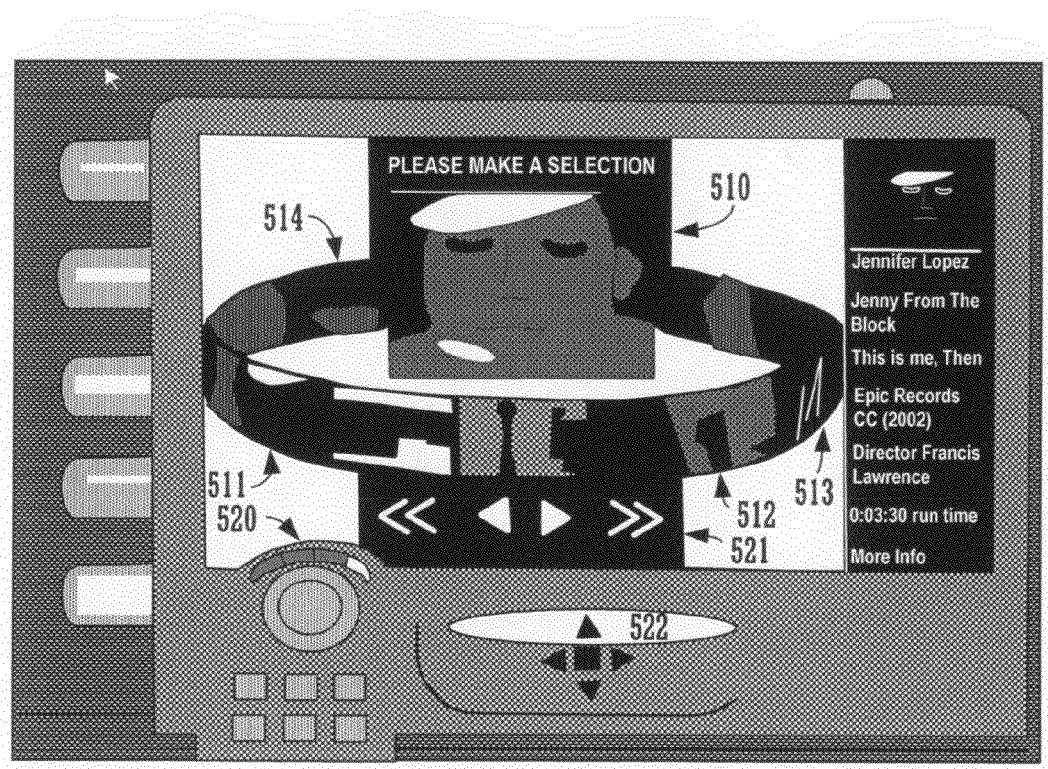
FIG. 5 is another exemplary utilization of a user interface and navigation presentation in accordance with one embodiment of the present invention.

In one implementation, content segments are presented as shown in FIG. 5, another exemplary utilization of a user interface and navigation presentation in accordance with one embodiment of the present invention. The presentation of FIG. 5 includes main viewing area 510 and a plurality of navigation areas (e.g., 511, 512, 513 and 514) in a ring or carousel configuration. In one embodiment, the selection and control of the content displayed in the main viewing area 510 and navigation viewing areas (e.g., 511, 512, 513 and 514) can be implemented with remote controller 520, screen interface 521 (e.g., that includes selection arrows) and/or control button 522. The center video content is the content a user is primarily interested and where in time the user is primarily viewing and the carrousel of images represents the multiple access points in time that the user can jump to with cognizance of the content. The user can spin the content in the carrousel to intelligently access content of interest.

It is appreciated the navigation viewing areas can be presented in a variety of configurations. The navigation viewing areas can be configured in accordance with exemplary rotational carrousel video navigation presentation 100 and 500, an exemplary globe navigation interface presentation configuration 400, a helix video navigation presentation, double helix video navigation presentation, in a raster pattern, along a display edge, etc. FIG. 4B is an exemplary helix video navigation presentation in accordance with one embodiment of the present invention. The exemplary helix navigation presentation includes navigation viewing areas 701 through 718 configured in a helix arrangement. It is appreciated that similar to movements in the carrousel or ring of FIG. 1A and the globe of FIG. 4A, movements or rotations in the helix can correspond to temporal relationships and/or different content. In one embodiment, as a helix rotates additional content from later or earlier in the same program or channel can be added or "fed" into the helix top or bottom. In one exemplary implementation, content associated with a different program or channel can also be moved onto or "fed" into the helix as the helix rotates. For example, initially the content presented in the navigation areas 701 through 718 can be associated with temporal points in a first program (e.g., odd number navigation areas 701, 703, 705, etc. have top of baseball innings content and even number navigation areas 702, 704, 706, etc. have bottom of baseball innings content). Then as the helix rotates, navigation areas 701 through 718 can be associated with temporal points in a second program. For example, content associated with the innings is shifted through the navigation areas to allow additional content to be added to the helix and content from a news program can be added starting at top navigation areas 718, 717, etc., or starting at bottom navigation areas 701, 702, etc depending on the rotation direction of the helix.

FIG. 4C is an exemplary raster pattern video navigation presentation in accordance with one embodiment of the present invention. The exemplary raster pattern video navigation presentation includes video navigation areas 720 through 731 arrange in rows and columns. FIG. 4D is an exemplary edge navigation presentation in accordance with one embodiment of the present invention. The exemplary edge video navigation presentation includes navigation areas 751 through 753 on a top edge of presentation 750 and/or navigation areas 754 through 757 on a side edge. It is appreciated that the navigation areas can occupy the entire edge of a presentation or a portion thereof, including the top, bottom, right and/or left edges. It is also appreciated that the present invention can be implemented in many more navigation area configurations which are not exhaustively presented in order not to obfuscate the invention. It is also appreciated that a main viewing area can also be presented concurrently with a globe, helix, raster and/or edge configurations of navigation areas. In one exemplary implementation, a main viewing area (not shown) similar to main viewing area 150 or 510 can be presented in center of presentation 750 with the navigation areas 751 through 757 presented concurrently on the edges.

The navigation viewing areas can appear to move. The movement or change in spatial relationship can correspond to changes in temporal relationships. For example, the carrousel ring configurations of FIG. 1A and FIG. 5 or the globe configuration of FIG. 4A can appear to remain stationary or rotate (e.g., in a carrousel fashion, spin like a globe, etc.). In one embodiment, navigation areas presenting content that is temporally closer to the content in the main viewing area are presented in the "front" of a ring or "center" of a globe. For example in a ring configuration, as the main viewing area content progresses through a program, the navigation clips from "later" in the program are moved closer to the front of the front of the ring. In one exemplary implementation, as the content in main viewing area 150 of FIG. 1 progresses through a program the content in viewing area 114 is moved to viewing area 113, the content from viewing area 115 is moved to viewing area 114, etc.

As indicated above, the present invention is readily adjustable for a variety of temporal relationships between the content in the main viewing area and the navigation viewing areas. In one embodiment, the length of a navigation content segment, content gaps between presented navigation content segments and the number of times a content segment loops in a navigation viewing area can vary. In one exemplary implementation the intervals can be 30 seconds for the first 3 navigation areas, 2 minutes for the next navigation area, 5 minutes for the next navigation area and 20 minutes for the next navigation area. As content in navigation areas are selected for presentation in the main viewing area, the intervals shift to repeat the pattern making the near term more granular.

Figure 1B:
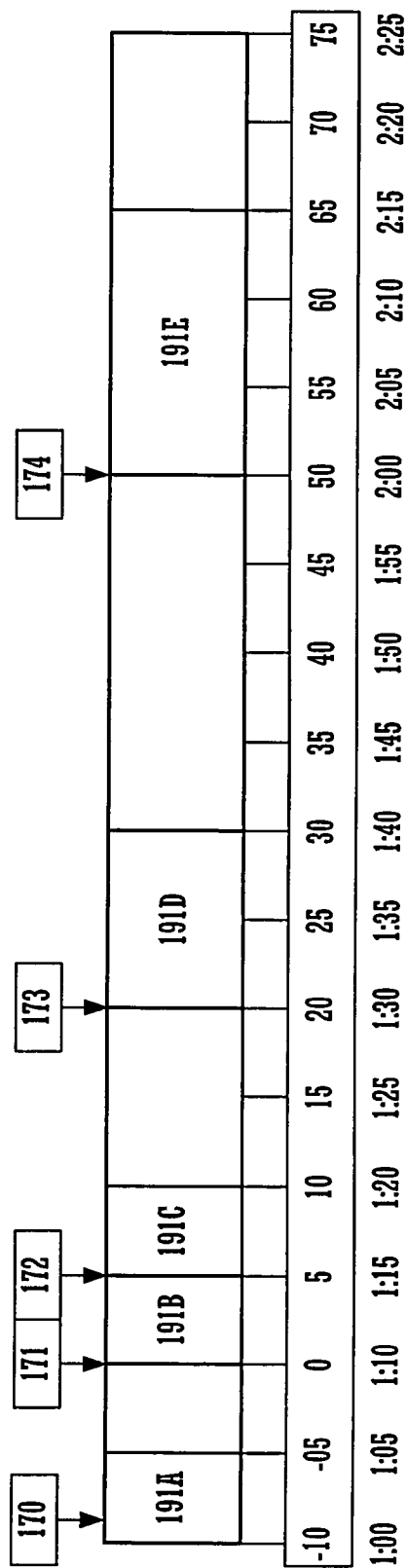
FIG. 1B is a block diagram of an exemplary temporal relationship of content and access points of a video in accordance with one embodiment of the present invention.
Figure 1C:
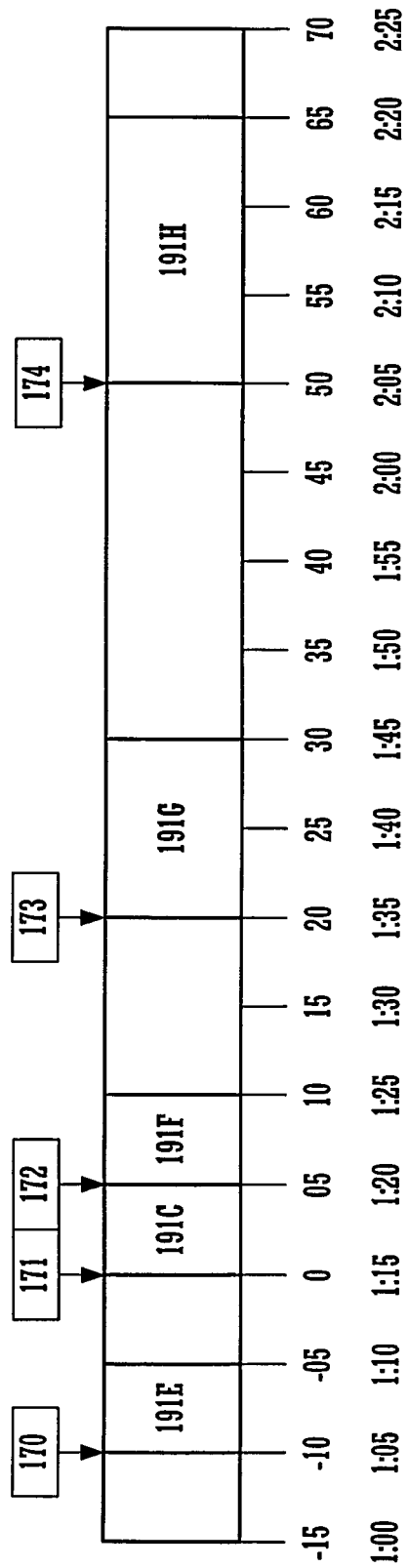
FIG. 1C is a block diagram of an exemplary temporal relationship of content and access points of a video after a five minute navigation skip in accordance with one embodiment of the present invention.
Figure 1D:
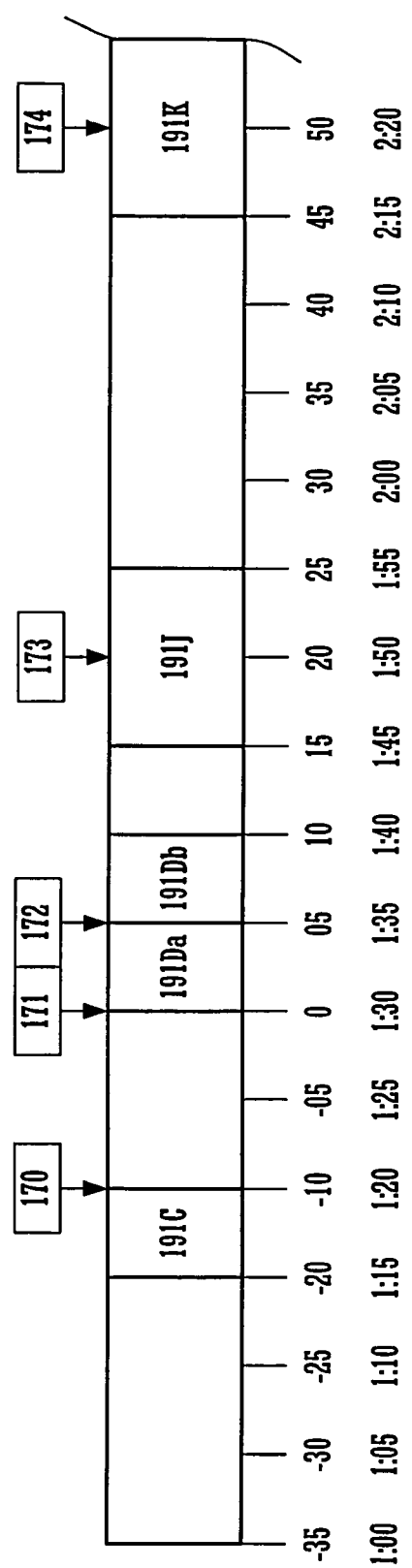
FIG. 1D is a block diagram of an exemplary temporal relationship of content and access points of a video after a fifteen minute navigation skip in accordance with one embodiment of the present invention.

FIGS. 1B, 1C and 1D are block diagrams of the temporal relationships of content of a video in a normal sequence. Content of a video stream is represented as block 191. FIGS. 1B, 1C and 1D include timing indication rows associated with two time lines. Relative time line indication row 192 includes timing indications relative to the content being displayed in a main viewing area. Normal flow content time line indication row 193 is associated with a absolute time line showing timing indications from the "earlier" in the content (e.g., content towards beginning of a television program, content from a previous television program, beginning of a movie, etc.) toward later portions of the content in a normal sequence. FIGS. 1B, 1C and 1D also include access pointers 170, 171, 172, 173 and 174 that point to access points in the content 191. The access points are associated with the beginning of a content segment and the content segments are separated by "gaps".

In one embodiment, the content of the stream 191 represented in FIGS. 1B, 1C and 1D is presented in exemplary rotational carrousel video navigation presentation 100. While navigation areas can be configured as shown FIGS. 1B, 1C and 1D, for purposes of the present exemplary implementation the content configuration shown in FIGS. 1B, 1C and 1D are intended to show the temporal relationship of content bits in a stream that are displayed in various navigation viewing areas as shown in FIG. 1A. Access pointers 170 through 174 are associated with the main viewing area and navigation areas of FIG. 1A in which the content is displayed or presented. The content starting at each of the respective access pointers 170 through 174 is presented in the respective main viewing and navigation areas shown in FIG. 1A.

It is appreciated that the access pointers can move to different portions of the content 191 shown in FIGS. 1B, 1C and 1D and thereby change the content segments presented in the main viewing and navigation areas of FIG. 1A. The content segment starting at access pointer 171 is presented in main viewing area 150, the content segment starting at access pointer 172 is presented in navigation area 113, the content segment starting at access pointer 173 is presented in navigation area 114, the content segment starting at access pointer 170 is presented in navigation area 112, and the content segment starting at access pointer 174 is presented in navigation area 115. In one exemplary implementation, since access pointer 172 is assigned to navigation area 113 when access pointer 172 points to different content the different content is displayed in the navigation area 113.

In one embodiment, a user can trigger a change in the video content of the main viewing area and navigation areas. In one exemplary implementation a user can indicate a video navigation "skip" or "jump" in which content starting at an access point associated with a navigation area is "moved" to or presented in the main area. It is appreciated that a skip or jump can "go" forward or backward in the video content. For example, if the video navigation system is being utilized to navigate a 1 hour sporting program and the second quarter of the program, a skip forward "distance" of 15 minutes further into the program can "go" to content in the third quarter and a skip backward "distance" of 15 minutes can "go" to content in the first quarter. It is also appreciated the skip or jump "distance" can vary (e.g., 5 seconds, 5 minutes, 10 minutes, 12 hours, etc.). The navigation areas can then be automatically updated with different content segments in accordance with a temporal relationship to the content being displayed in the main viewing area. The temporal relationship can include drilling down or zooming down temporally. In one exemplary implementation, as content is "rotated" to the front of a carousel the granularity of the content segments and timing gaps between content in the navigation areas can be reduced and as content is "rotated" to the back navigation areas the content segments and gaps can be increased.

It is appreciated that the gaps between the end of a first content segment in a first navigation viewing area and second content in a second navigation viewing area can be reduced to zero so content is not skipped between the first content segment and second content segment. In one exemplary implementation, the navigation viewing areas are updated automatically and the first viewing area presents the first content segment and when finished presenting the first content segment, the first navigation viewing area is updated with the second content segment without "losing" content or skipping content in a gap. The second navigation viewing area can continue to show the second content segment or can also be automatically updated with a third content segment that follows the second content segment.

It is appreciated that navigation interfacing can be facilitated in a number of different ways. In one exemplary implementation, a user can select or "grab" the content in a navigation viewing area and move it to another navigation area or main viewing area. The movement can be presented as an abrupt movement (e.g., a first frame and then a sudden jump to a nonsequential frame) or can include animation to give a user a perception of the movement. In one exemplary implementation, when a content segment of a navigation area is selected for movement to the main viewing area, an animation showing the transition is presented and perspective compensation changes can be included. There can also be an animation presentation and perspective compensation changes included to represent a content segment "movement" from the main viewing to a navigation viewing area. In one exemplary implementation, as the "movements" of content segments between navigation viewing areas occur, the carousel or globe of navigation areas appears to rotate corresponding to movement of the content segments. The speed of the rotation can also be captured in the animation to provide the user with a perspective of how fast the carousel or globe is rotating.

As indicated above, access pointers associated with the main viewing area and navigation areas can move to different locations or times in the video content. In one embodiment, movements between the navigation areas trigger forward or backward skips or expedited transitions to other portions of a program content. A clockwise rotation of a carousel can indicate a fast forward skip or movement in program content. With reference to FIG. 1A, in one exemplary implementation if a user "moves" a portion of the content segment associated with content "later" in a program stream presented in navigation area 115 to navigation area 113 it can appear as through the carousel moved in a clockwise direction as the navigation performs the forward expediting of the content presentation. Alternatively, if navigation area 111 is associated with a content segment from "earlier" in the program content the "movement" of a content segment from navigation area 111 to navigation area 113 can appear as a counter clockwise rotation.

FIGS. 1B, 1C and 1D show exemplary changes in the temporal relationships of the access pointers. In one exemplary implementation, FIG. 1B represents a first relationship of access pointers with respect to program content (e.g., a sporting event, a movie, a news program, a television serial, etc.). It is appreciated that the initial starting location of the access pointers does not necessarily have to coincide identically with a program content start time. For example, a user could turn a program on at the program beginning (e.g., first batter of first baseball game inning, the tip off of a basketball game or soccer game, introduction or opening credits of a movie, etc.) or may turn a program on at a later point (e.g., third inning of a baseball game, 5 minutes into second half of a basketball or soccer game, second scene of a movie, etc.).

The first location of access pointer 171 is 1:10 or 1 hour 10 minutes into the program as shown by content time line 193. Initially access pointer 171 is associated with a content segment 191B that is 5 minutes long. Initially the content segment 191B is presented in the main viewing area 150 and there fore is shown as a zero time differential on the relative time line 192.

The first location of access pointer 172 is associated with a content segment that starts 1:20 or 1 hour 20 minutes into the program as shown by content time line 193. Access pointer 172 is 5 minutes after access pointer 171 as shown by relative time line 192. Initially access pointer 172 is associated with a content segment 191C that is 5 minutes long and has a and has a zero minute gap between the end of content segment 191B and beginning of content segment 191C. Initially the content segment 191C is presented in the navigation viewing area 113.

The first location of access pointer 173 is associated with a content segment that starts 1:30 or 1 hour 30 minutes into the program as shown by content time line 193. Access pointer 173 is 20 minutes after access pointer 171 as shown by relative time line 192. Initially access pointer 173 is associated with a content segment 191D that is 10 minutes long and has a 10 minute gap between the end of content segment 191C and beginning of content segment 191D. Initially the content segment 191D is presented in the navigation viewing area 114. In one exemplary implementation, a navigation "skip" or "jump" from content 191B to content 191C is a 20 minute jump ahead or fast forward in the program content.

The first location of access pointer 174 is associated with a content segment that starts 2:05 or 2 hours 5 minutes into the program as shown by content time line 193. Access pointer 174 is 50 minutes after access pointer 171 as shown by relative time line 192. Initially access pointer 174 is associated with a content segment 191E that is 15 minutes long and has a 20 minute gap between the end of content segment 191D and beginning of content segment 191E. Initially the content segment 191D is presented in the navigation viewing area 115. In one exemplary implementation, a navigation "skip" or "jump" from content 191B to content 191E is a 50 minute jump ahead or fast forward in the program content.

The first location of access pointer 170 is associated with a content segment that starts 1:00 or 1 hour into the program as shown by content time line 193. Access pointer 170 is 10 minutes behind access pointer 171 as shown by relative time line 192. Initially access pointer 170 is associated with a content segment 191A that is 5 minutes long and has a 10 minute gap between the beginning of content segment 191B and beginning of content segment 191A. Initially the content segment 191A is presented in the navigation viewing area 112. In one exemplary implementation, a navigation "skip" or "jump" from content 191B to content 191A is a 10 minute jump back or reverse in the program content.

It is also appreciated that the content segment presentation can be altered. In one exemplary implementation, the number of times a content segment is looped in a navigation presentation area can be incremented. For example, a navigation viewing area can loop the presentation of the content segment 3 times before updating the content segment with different content and in another exemplary implementation the navigation viewing area loops the presentation of the content 5 times before updating the content segment. For example, with reference to FIG. 1B the content 191E displayed in navigation viewing area 115 can begin at 2 hours into the program and present the content segment to a time 2 hours 15 minutes into the program and then loop back to start the content segment again at 2 hours into the program, repeating the "looping" in accordance with the designated number of loops (e.g., 1 loop, 3 loops, 5 loops, etc).

Starting with the temporal relationships of FIG. 1B a user can interact with a present navigation system to indicate a skip or jump to the temporal relationships of FIG. 1C. The user can trigger a navigation movement of the content segment 191C from navigation area 113 under the FIG. 1B temporal relationships to main viewing area 150 under the temporal relationships of FIG. 1C. After the jump to the temporal relationships of FIG. 1C, the start of content segment 191C is now pointed to by access pointer 171. Thus, access pointer 171 now points to a content segment starting at 15 minutes into the program as shown by program time line 193C instead of 10 minutes and the content segment 191C is now presented in main viewing area 150 instead of navigation area 113. The navigation area presentations can be automatically updated with new content segments. The content segment 191F is now pointed to by access pointer 172 (which is changed to 20 minutes into the program instead of 15) and is presented in navigation area 113, the content segment 191G in now pointed to by access pointer 173 (which is changed to 35 minutes into the program instead of 30) and is presented in navigation area 114, the content segment 191F is now pointed to by access pointer 170 (which is changed to 5 minutes into the program instead of from a prior program) and is presented in navigation area 112, and the content segment 191I is now pointed to by access pointer 174 (which is changed to 65 minutes into the program instead of 60) and is presented in navigation area 115.

Starting with the temporal relationships of FIG. 1B a user can interact with a present navigation system to also indicate a skip or jump to the temporal relationships of FIG. 1D. The user can trigger a navigation movement of the content segment 191D from navigation area 114 under the FIG. 1B temporal relationships to main viewing area 150 under the temporal relationships of FIG. 1D. After the jump to the temporal relationships of FIG. 1D, the content segment 191D is split and the start of content segment 191Da is now pointed to by access pointer 171. Since the navigation viewing area 172 includes a content segment length that is 5 minutes long and starts 5 minutes "later", the 10 minute content segment 191D is split into two segments 191Da and 191Db. The split of content segment 191D is one example of granularity changes in content segments as navigation content is "moved" between navigation areas.

In FIG. 1D, access pointer 171 now points to a content segment starting at 30 minutes into the program as shown by the program time line 193D instead of 10 minutes and is presented in main viewing area 150 instead of navigation viewing area 114 (with reference back to FIG. 1B). The present invention again automatically updates presentations in the navigation areas with new content segments. The content segment 191Db is now pointed to by access pointer 172 (which is changed to 35 minutes into the program instead of 15) and is presented in navigation area 113, the content segment 191j is now pointed to by access pointer 173 (which is changed to 50 minutes into the program instead of 30) and is presented in navigation area 114, the content segment 191C is now pointed to by access pointer 170 (which is changed to 20 minutes into the program instead of from a prior program) and is presented in navigation area 112, and the content segment 191K is pointed to by access pointer 174 (which is changed to 80 minutes into the program instead of 60) and is presented in navigation area 115.

In one exemplary implementation, the length of a content segment and the size of the gaps between content segments displayed in navigation areas are variable. For example, instead of a navigation jump or gap of 15 minutes between access point 172 and 173 the duration of the gap can be changed to 20 minutes which would move access point 173 to 35 minutes into the program in FIG. 1B, 40 minutes into the program in FIG. 1C and 55 minutes into the program in FIG. 1D. This would result in a content loop being presented in navigation area 114 that starts 20 minutes ahead of the start of the content loop in navigation area 113 and 25 minutes ahead of the start of the content loop in main viewing area 150.

While the access points at which a navigation area presentation loop start can be moved, the duration of the loop in the navigation loops can also be changed. For example, the video loop associated with navigation area 113 and access point 172 can be set to a 5 minute looping duration. Thus, the video loop presented in navigation area 113 would loop the content between 15 minutes into the program and 20 minutes into the program under the FIG. 1B scenario and would loop the content between 20 minutes into the program and 25 minutes into the program under the FIG. 1C scenario. The video loop could be changed to 10 minute looping duration and the video loop presented in navigation area 113 would loop the content between 15 minutes into the program and 25 minutes into the program under the FIG. 1B scenario and would loop the content between 20 minutes into the program and 30 minutes into the program under the FIG. 1C scenario.

The temporal relationships can be automatically adjusted, can be adjusted by a user, and/or a combination thereof. In one embodiment, automatic adjustment can be triggered to coincide with information included in the stream. In one embodiment the video stream includes indicators of access points (e.g. indicator of a beginning of an inning, an at bat, etc.). In one embodiment, temporal relationships may be based on the subject of the stream. For example, if the average time between top of innings is 15 minutes in a baseball game the temporal relationship could be automatically set to 15 minute loops with starting times 15 minutes apart based upon indication of a baseball game and if the average time between a change in possession of the ball in basketball game is 35 seconds the temporal relationship could be automatically set to 35 second loops 70 seconds apart. This would allow a user to skip on average to the beginning or close to the beginning of an inning or at bat in a baseball game and to a particular teams possessions in a basketball game.

In one exemplary implementation, a user is primarily interested in a viewing a baseball game. The content in the navigation areas is associated with programming on a particular broadcast channel that is forwarded in a single communication stream. For example, initially content associated with the beginning of the baseball game can be displayed in the main viewing area 150. A 1 minute duration looping clip of content associated with 5 minutes after the beginning of the main viewing content can be displayed in navigation area 113. A 5 minute duration looping clip of content associated with 15 minutes after the beginning of the main viewing content can be displayed navigation area 114.

The presentation of the information in video clips of the navigation areas facilitates cognitive jumping to portions of a video stream. The navigation areas also facilitate intuitive jumping. For example, if a particular navigation area is presenting a first player up at bat in a baseball game, by knowing the up at bat or batting order of the players a user can make a jump to the clip of the first player at bat with an intuition that a second player up at bat is probably very close in the inning. If after making the jump to the content the second player does not come up to bat because the first player is the third out, a user can make an intuitive jump to another navigation clip associated with the start of the next inning in anticipation of the second player coming up to bat.

The duration of the loops can be staggered so that navigation areas farther from the front navigation area 113 get longer based upon the "distance" from the front navigation area. For example, a 5 minute duration looping clip of content associated with 15 minutes after the main viewing content in navigation area 150 can be displayed in navigation area 113, a 15 minute duration looping clip of content associated with 30 minutes after the beginning of the main viewing content can be display in navigation area 114, a 15 minute duration looping clip of content associated with 30 minutes before the beginning of the main viewing content can be displayed in navigation area 112, a 30 minute duration looping clip of content associated with 45 minutes after the beginning of the game can be displayed in navigation area 115, a 30 minute duration looping clip of content associated with 45 minutes before the beginning of the game can be displayed in navigation area 111, a 1 hour duration looping clip of content associated with 1 hour after the beginning of the game can be displayed in navigation area 121, a 1 hour duration looping clip of content associated with 1 hour after the beginning of the game can be displayed in navigation area 125, etc.

It is appreciated that the navigation viewing areas can present a variety of different content, including content that is associated with different programs. In one embodiment, the navigation viewing areas towards the front of the navigation ring are more closely associated with content of a first program currently being presented in the main viewing area and navigation viewing areas in the back of the navigation ring are associated with content of a second program and third program. With reference back to FIG. 1A, in one exemplary implementation, navigation viewing areas 111 through 115 can be associated with a first program (e.g., a sporting event, movie, etc.) and navigation viewing areas 121 through 125 can be associated with a different second program (e.g., other sporting event, news, music video, a different channel, different time on same channel, etc.). It is also appreciated that the main viewing area and/or navigation viewing area can facilitate navigation associated with different types of content. In one exemplary implementation, a main viewing area initially presents a video game, a first, second and third navigation area are associated with a first, second and third portion of television program, and a fourth and fifth navigation area are associated with supplemental data (e.g., embedded content, data delivered in internet protocol packets, etc.). A user can navigate or "skip to" the different types of content and "pull" content associated with the navigation areas into the main viewing area.

Figure 4A:
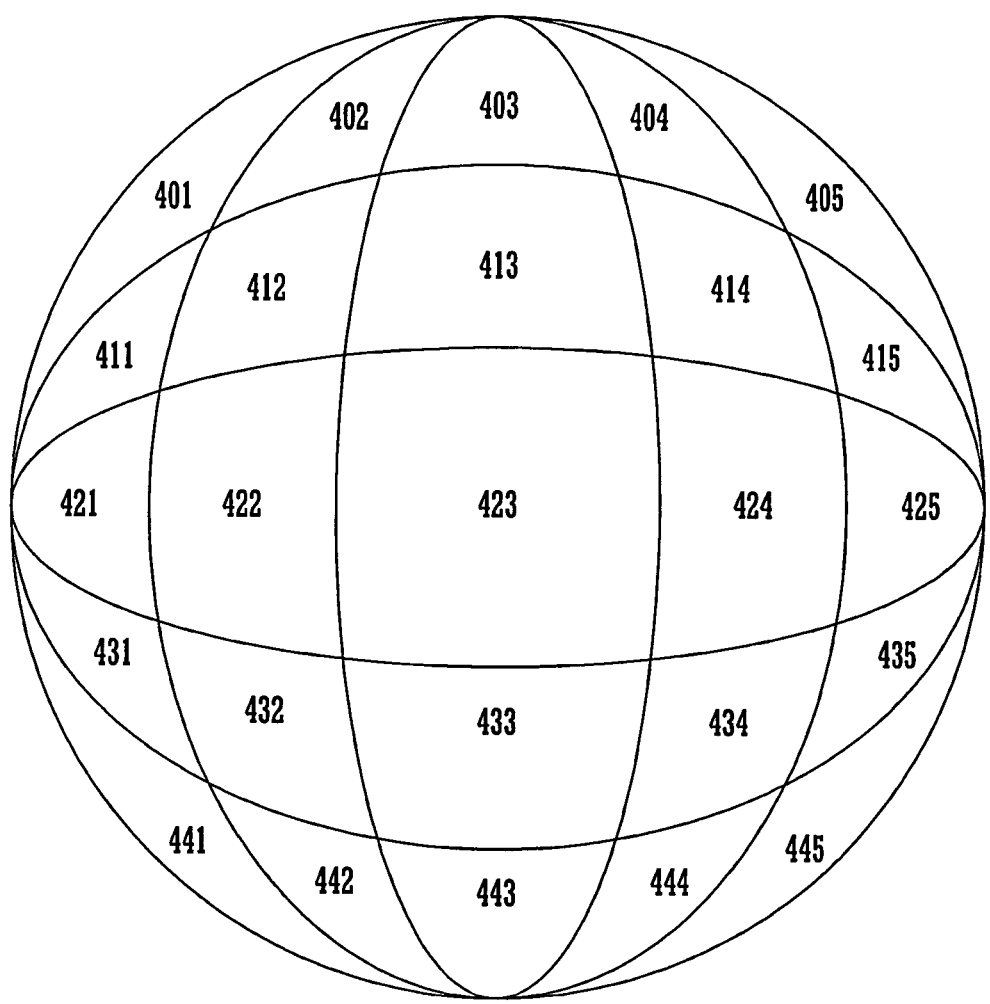
FIG. 4A is a block diagram of an exemplary globe navigation interface presentation configuration in accordance with one embodiment of the present invention.
Figure 4B:
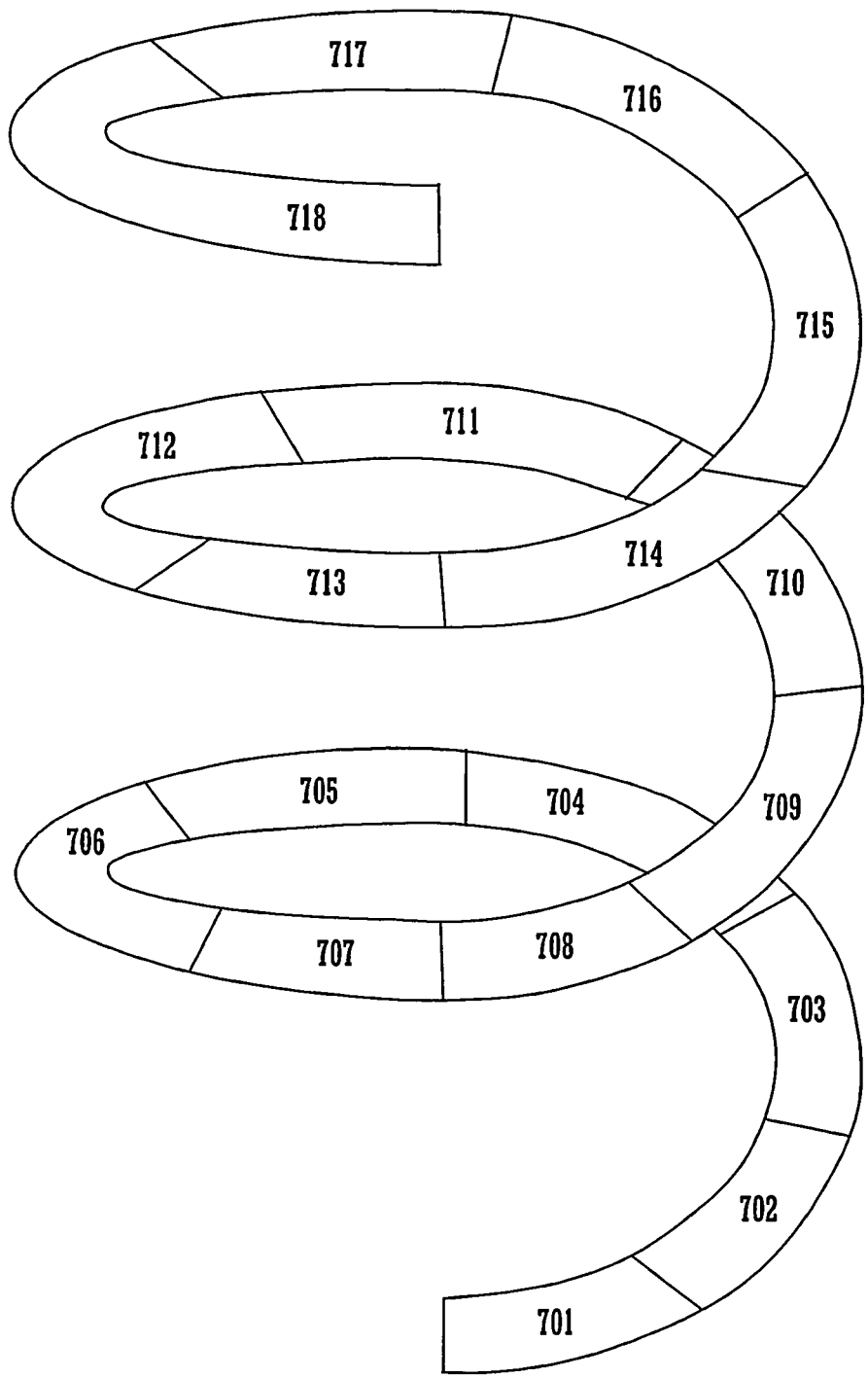
FIG. 4B is an exemplary helix video navigation presentation in accordance with one embodiment of the present invention.
Figure 4D:
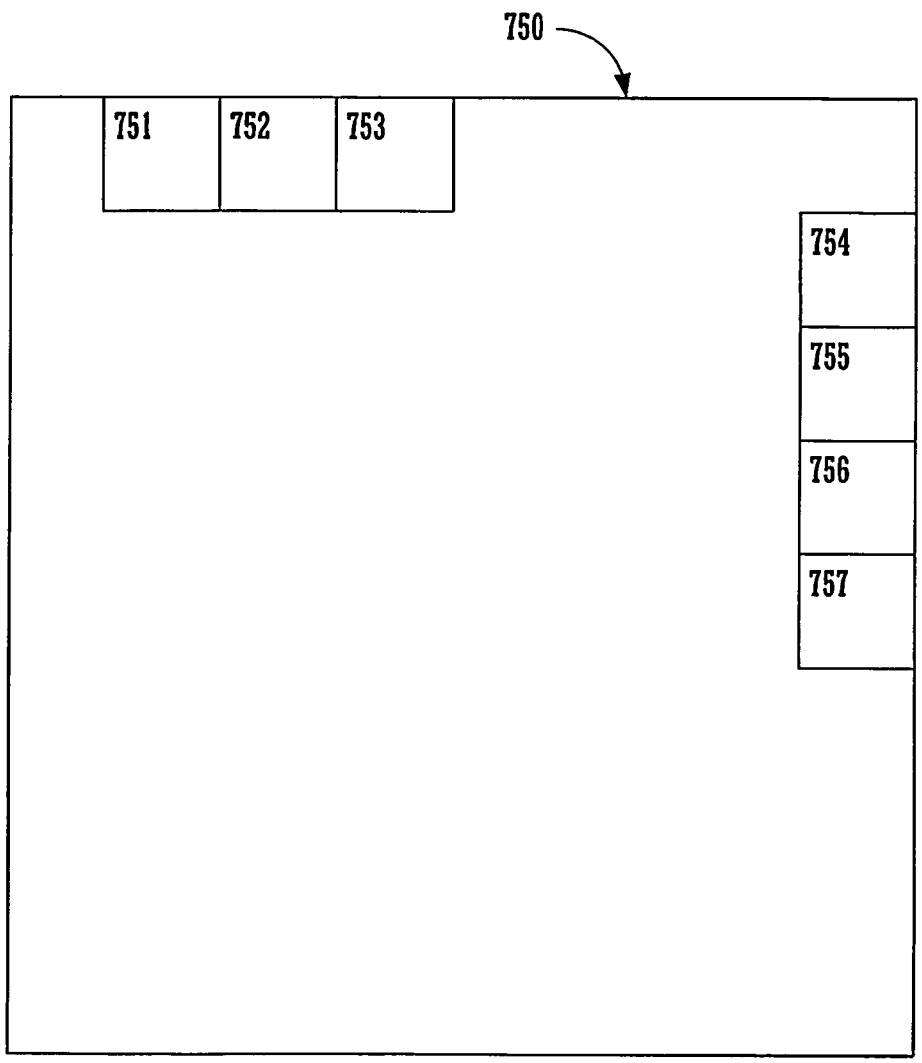
FIG. 4D is an exemplary edge navigation presentation in accordance with one embodiment of the present invention.

FIG. 4A is a block diagram of an exemplary globe navigation interface presentation configuration 400 in accordance with one embodiment of the present invention. Globe navigation interface 400 includes navigation viewing areas 401 through 445. In one embodiment, the horizontal orientation of the globe navigation interface 400 corresponds to time access points within the content and the vertical orientation corresponds to different program content streams. For example, navigation areas 401 though 405 are associated with a first video stream (e.g., a soccer game, a American football game, etc.), navigation areas 411 through 415 are associated with a second video stream (e.g., a news program, a talk show, etc.), navigation areas 421 through 425 are associated with a third video stream (e.g., a baseball game, a movie, etc), navigation areas 431 through 435 are associated with a fourth video stream (e.g., a history documentary; cartoons, etc.), and navigation areas 431 through 435 are associated with a fifth video stream (e.g. a nature documentary, a music video, etc.).

Navigation areas 403, 413, 423, 433, and 443 are associated with a temporal period of primary interest and/or default (e.g., a current broadcast, a initial point in a program, a midpoint in a program, selected content that is moved other navigation areas, etc.). Navigation areas 401, 411, 421, 431, and 441 are associated with a first temporal period before (e.g., 1 hour before, 30 minutes before, etc.) the timing associated with navigation areas 403, 413, 423, 433, and 443. Navigation areas 402, 412, 422, 432, and 442 are associated with a second temporal period before (e.g., 5 minutes before, 30 seconds before, etc.) the timing associated with navigation areas 403, 413, 423, 433, and 443. Navigation areas 404, 414, 424, 434 and 444 are associated with a fourth temporal period after (e.g., 1 minute after, 5 minutes after, etc.) the timing associated with navigation areas 403, 413, 423, 433, and 443. Navigation areas 405, 415, 425, 435, and 445 are associated with a fifth temporal period after (e.g., 1 hour after, 2 hours after, etc.) the timing associated with navigation areas 403, 413, 423, 433, and 443.

The globe in FIG. 4A can "spin" vertically or horizontally. Content and program streams can be "added" or "removed" from the globe presentation based upon the "rotation". For example, video content associated with different channels can be added or deleted from the globe. In one embodiment the globe spins in response to user input.

In one embodiment, multiple streams are accessed at a specific location. A user can review an electronic program guide (EPG) and actually see multiple video clips of each channel in the EPG. The user can visually see what the program is, as well as what is happening in the program content.

In one embodiment, a user can close or open the navigation capabilities. In one exemplary implementation, when a user closes or deactivates the navigation viewing areas, the main viewing area or block occupies the whole display and when a user opens or activates the navigation viewing areas they are presented either with the main viewing block or by themselves. It is appreciated that the navigation capabilities can be opened or closed based upon an automatic trigger. For example, navigation viewing areas can be opened automatically when a program is initially selected, when a user initiates a fast forward indication, a reverse back indication or at a certain point in the programming (e.g. commercials, at a timing interval, etc.). The navigation viewing areas can be automatically closed after a certain duration of time, after a user selects one of the skip option blocks to be displayed in the main viewing block, etc. It is appreciated that animation, zoom and perspective alterations can be handled automatically.

Figure 3:
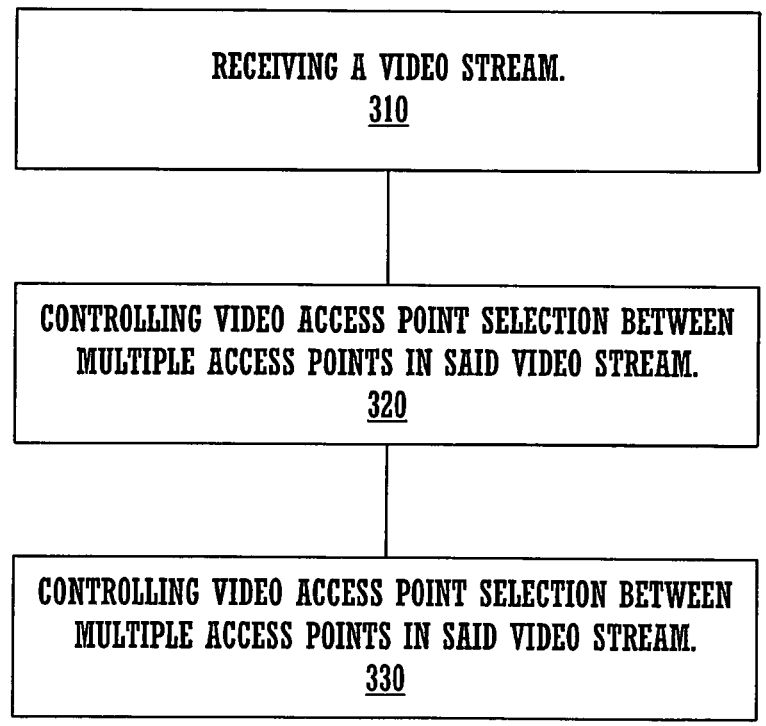
FIG. 3 is a flow chart an exemplary video information control method in accordance with one embodiment of the present invention.

FIG. 3 is a flow chart a video information control method 300 in accordance with one embodiment of the present invention. In one embodiment, video information control method 300 facilitates navigation control of video content.

At block 310, a video stream is received. In one embodiment, the video stream is associated with a program. In one exemplary implementation, the video stream is associated with a television broadcast or program (e.g., sporting event, movie, series, news broadcast, etc.).

At block 320, video access point selection between multiple access points in the video stream is controlled. In one embodiment, the controlling includes creation of navigation clip information associated with the video stream based upon selection of the multiple access points. The navigation clip information can include video frames and sequence information for enabling content navigation. In one exemplary implementation, the controlling also includes accessing a compressed video or audio video (AV) stream at specific time intervals and decoding the AV stream at the specific time intervals to create the information associated with the navigation clip. The controlling can also include adjusting granularity of the length of a navigation clip and gaps between navigation clips associated with each of the multiple access points.

At block 330, presentation information (e.g., rendering information, etc.) for each of the multiple access points is forwarded. In one embodiment, the presentation information is forwarded to a user interface. The forwarding can include forwarding information associated with a plurality of the multiple access points for simultaneous presentation. In one exemplary implementation, the information includes information associated with a main viewing area and a navigation clip viewing area.

In one embodiment of a video information control method multiple video streams are received. Controlling of the video access point selection includes controlling access between multiple access points within each video stream and also across multiple video streams. In one exemplary implementation, the video access point selection is controlled between multiple access points within each video stream and across multiple video streams.

Figure 2:
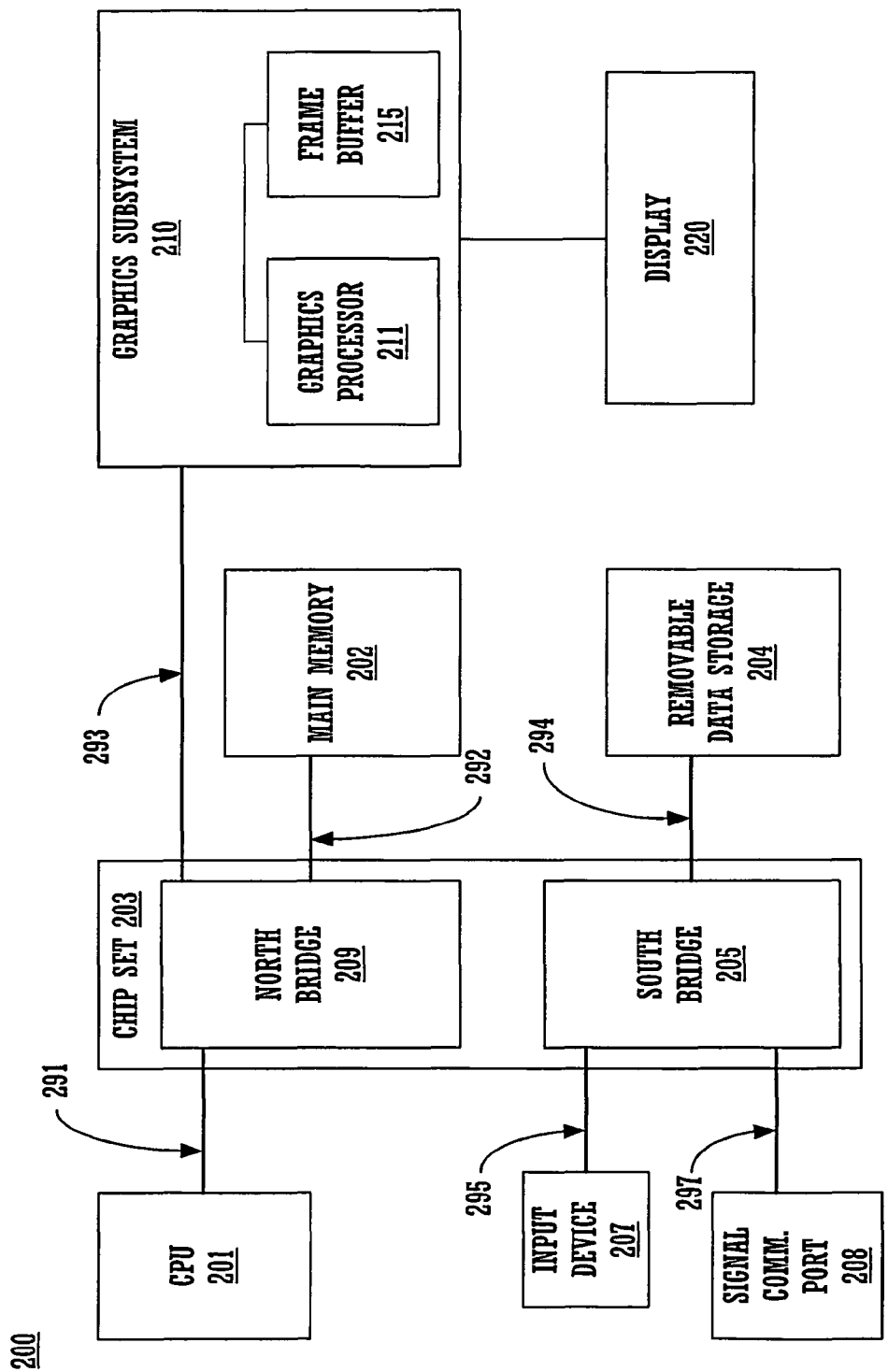
FIG. 2 is a block diagram of an exemplary video information control system, one embodiment of a computer system upon which embodiments of the present invention can be implemented.

FIG. 2 is a block diagram of an exemplary video information control system 200, one embodiment of a computer system upon which embodiments of the present invention can be implemented. Computer system 200 includes central processor unit 201, main memory 202 (e.g., random access memory), chip set 203 with north bridge 209 and south bridge 205, removable data storage device 204, input device 207, signal communications port 208, and graphics subsystem 210 which is coupled to display 220. Computer system 200 includes several busses for communicatively coupling the components of computer system 200. Communication bus 291 (e.g., a front side bus) couples north bridge 209 of chipset 203 to central processor unit 201. Communication bus 292 (e.g., a main memory bus) couples north bridge 209 of chipset 203 to main memory 202. Communication bus 293 (e.g., the Advanced Graphics Port interface) couples north bridge of chipset 203 to graphic subsystem 210. Communication buses 294-297 (e.g., a PCI bus) couple south bridge 205 of chip set 203 to removable data storage device 204, input device 207, and signal communications port 208 respectively. Graphics subsystem 210 includes graphics processor 211 and graphics buffer 215.

The components of computer system 200 cooperatively operate to provide presentations of graphics images. Communications bus 291 through 297 communicate information. Central processor 201 processes information. Main memory 202 stores information and instructions for the central processor 201. Main memory 202 also stores information for directing the controlling of the video access point selection between multiple access points in a video stream. Removable data storage device 204 also stores information and instructions (e.g., functioning as a large information reservoir). Input device 206 provides a mechanism for inputting information and/or for pointing to or highlighting information on display 220. Signal communication port 208 provides a communication interface to exterior devices (e.g., an interface with a network). Display device 209 displays information in accordance with data stored in frame buffer 215. Graphics processor 211 processes graphics commands from central processor 401 and provides the resulting data to graphics buffer 215 for storage and retrieval by display monitor 220. Graphics process 211 can also control video access point selection between multiple access points in a video stream. It is appreciated that central processor unit 210 can also be utilized to participate in controlling video access point selection.

In one embodiment, the graphic processor 211 includes multiple source filters where sources are defined as access points to a compressed AV stream. In one exemplary implementation, a processor effectively treats one stream as multiple streams by accessing the one stream at multiple points. The processor can perform multiple demultiplex filtering for stripping a program stream of its AV elements for decode and time division multiplexed decompression for establishing multiple navigation clip information at different times in a normal sequence presentation. In one embodiment, the multiple demulitplexing takes the content "of" the transport carrier and results in a program stream of audio video data. The processor can also perform fast decompression context switching. In one embodiment, the fast context switching is at a minimum 1/n frame rate, where n equals the number of concurrent access points. In one exemplary implementation, memory access and flushing is governed by a multimedia application program interface (API) and the buffers can be directed to operate on different hierarchies. For example, a processor may be working on inverse discrete cosine transform, motion compensation, inverse quantization, etcetera, and each one can have a fast context switch. It is not limited to the processor decoding one portion of a video stream and then another portion, within operations directed to each of the video stream portion decodes there can be a context switch to other hierarchy operations. In one embodiment, a context switch includes flushing a pipeline, loading a different set of unrelated data in the pipeline and processing the loaded data. After the processing the pipeline is flushed again, another different set of unrelated data is loaded and processed while another part of the chip is rendering and controlling display of the results. The sequence of context switch facilitates serial processing of multithread video. In one embodiment, the context switching includes decrypting.

In one embodiment, the process performs a number of graphics processing functions while preparing the navigation presentation information. In one embodiment, the information forwarded by the processor includes information associated with overlay blending, background capture (e.g., other than the present channel or main viewing area presentation capture) and playback looping. The processor performs texture mapping for mapping decompressed video onto three dimensional objects for three dimensional or perspective contextual varying content navigation. The processor can also perform decompression of single intra frame and conversion to single frame elements for navigation clip thumbnail generation. In one exemplary implementation, the processor includes a multi-stream scalar and compositor to scale decoded/decompressed video into picture in picture (PIP) windows and give the presentation perspective.

In one embodiment, a variety of audio visual devices (not shown) can be coupled to computer system 200 including a television receiver (e.g., for receiving television signals from a satellite, cable, etc,), a DVD player, a CD player, a digital video recorder or DVR (e.g., for storing audio video files including MPE-2 compressed files in digital format, files from television transmission, from a DVD, downloaded from the Internet, etc.). Computer system 200 can also be configured to receive control signals from a variety of user input mechanisms, including a remote control, a cursor control device, terrestrial cable, satellite, etc.

It is appreciated the present invention is readily adaptable to a variety of user interfaces and programming information. In one embodiment, the present invention is readily adaptable for utilization with a three dimensional (3D) user interface as described in co-pending patent entitled Apparatus and Method for 3D Electronic Program Guide Navigation; application Ser. No 10/609,204; filed Jun. 27, 2003 which is incorporated herein by this reference. For example, navigation loop video playback loops can be presented in navigation areas corresponding to the media thumbnails 1405 and/or polyhedron 1450. FIG. 5 is another exemplary utilization of a user interface and navigation presentation in accordance with one embodiment of the present invention. The center video content is the content a user is primarily interested and where in time the user is primarily viewing and the carrousel of images represents the multiple access points in time that the user can jump to with cognizance of the content. The user can spin the carrousel to intelligently access video of interest.

While portions of the detailed description have been described in terms of video extraction and presentation in navigation, it is appreciated that embodiments can include a variety of content extraction. For example, embodiments can include audio visual (AV) content extraction, still frame extraction, etcetera, and the extracted content can be forwarded for presentation in navigation areas or windows. It is appreciated that audio associated with content of the main viewing area or navigation areas can be presented Thus, the present invention facilitates improved digital video navigation capabilities. Actual skips closer to desired presentation locations can be displayed in a timely manner. The number of jumps and uncertainty in the skips are reduced. Flexibility in skip lengths or times and presentation of navigation windows facilitates improved user experience.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A video information control method comprising:
receiving a video stream;
controlling video information generation in a processor based upon multiple access points in said video stream;
forwarding rendering information corresponding to each of said multiple access points, wherein said forwarding includes forwarding rendering information associated with a plurality of said multiple access points for simultaneous presentation, wherein at least one of said plurality of said access points is associated with a different temporal relationship from another one of said plurality of said access points, wherein said rendering information includes rendering information associated with a main viewing area and a skip clip viewing area, and content from a skip clip viewing area is movable to said main viewing area enabling a skip in the main viewing area to a different time in a normal sequence presentation.

2. A video information control method of claim 1 wherein said controlling includes creating navigation clip information associated with said video stream based upon selection of said multiple access points.

3. A video information control method of claim 2 wherein said navigation clip information includes video frames and sequence information for enabling content navigation.

4. A video information control method of claim 2 wherein said video stream includes an audio video stream and said controlling comprises:
accessing a compressed version of said audio video stream at specific time intervals; and
decoding said compressed version of said audio video stream at the specific time intervals to create said rendering information associated with said navigation clip.

5. A video information control method of claim 1 wherein said controlling comprises adjusting granularity of the length of decoding associated with each of said multiple access points.

6. A video information control method of claim 1 wherein said rendering information includes rendering information associated with a main viewing area and a skip clip viewing area.

7. A video information control method of claim 1 wherein said controlling includes automatically creating skip clip lengths for skip clips based upon duration from a normal sequential presentation time presented in a current main viewing area.

8. A video information control system comprising:
a processor for controlling video access point selection between multiple access points in a video stream and organizing corresponding multiple navigation clip information and forwarding said corresponding multiple navigation clip information for simultaneous presentation, wherein at least one said video access points is associated with a different temporal relationship from another one of said video access points, wherein multiple demultiplex filtering is performed to strip a program stream of its audio video elements for decode and time division multiplexed decompression is performed to establish multiple navigation clip information at different times in a normal sequence presentation;
a memory for storing information, including information for directing said controlling of said video access point selection between multiple video access points in a video stream and organization of said navigation clip information; and
a bus for communicating said information.

9. A video information control system of claim 8 wherein said processor includes multiple source filters where sources are defined as access points to at least one compressed audio video stream.

10. A video information control system of claim 8 wherein said processor performs fast decompression context switching.

11. A video information control system of claim 8 wherein said information includes information associated with overlay blending, background capture, scaling rendering compositing and playback looping.

12. A video information control system of claim 8 wherein said processor performs texture mapping for mapping decompressed video onto three dimensional objects for three dimensional content navigation.

13. A video information control system of claim 8 wherein said processor performs decompression of single intra frame compressed frame and conversion to single frame elements for navigation clip thumbnail generation.

14. A video information control system of claim 8 wherein said processor includes a multi-stream scalar to scale decoded/decompressed video into picture in picture (PIP) windows.

15. A video navigation system comprising:
a processor for controlling video access point selection between multiple video access points in a video stream and organizing corresponding multiple navigation clip information and forwarding said corresponding multiple navigation clip information for simultaneous presentation, wherein at least one said video access points is associated with a different temporal relationship from another one of said video access points, wherein said rendering information includes rendering information associated with a main viewing area and a skip clip viewing area, and content from a skip clip viewing area is movable to said main viewing area enabling a skip in the main viewing area to a different time in a normal sequence presentation;
a memory for storing information, including information for directing said controlling of said video access point selection between multiple video access points in a video stream, wherein said information includes said multiple navigation clip information; and
a display for presenting said multiple navigation clip information.

16. A video navigation system of claim 15 wherein said information includes information associated with a navigation clip carousel presentation.

17. A video navigation system of claim 15 wherein said information includes information associated with a navigation clip globe.

* * * * *